US012633307B1

(12) United States Patent　　(10) Patent No.:　US 12,633,307 B1
Kermiche et al.　　　　　　　　　(45) Date of Patent:　May 19, 2026

(54) DATA STORAGE DEVICE WITH JITTER-BASED TOUCHDOWN DETECTION

(71) Applicant: Western Digital Technologies, Inc., San Jose, CA (US)

(72) Inventors: Noureddine Kermiche, Dana Point, CA (US); Robert Eaton, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/087,791

(22) Filed: Mar. 24, 2025

(51) Int. Cl.
　　　*G11B 5/60*　　　(2006.01)
(52) U.S. Cl.
　　　CPC ............ *G11B 5/6076* (2013.01); *G11B 5/607* (2013.01)
(58) Field of Classification Search
　　　None
　　　See application file for complete search history.

(56) References Cited

U.S. PATENT DOCUMENTS

| | | | | |
|---|---|---|---|---|
| 5,825,577 | A * | 10/1998 | Miyatake | ........... G11B 5/60 |
| | | | | 360/75 |
| 8,681,445 | B1 * | 3/2014 | Kermiche | ........... G11B 5/607 |
| | | | | 360/55 |
| 8,699,173 | B1 * | 4/2014 | Kang | ........... G11B 5/6076 |
| | | | | 360/75 |
| 9,001,453 | B1 | 4/2015 | Knigge et al. | |
| 9,214,188 | B1 * | 12/2015 | Tan | ........... G11B 5/6029 |
| 9,343,083 | B2 | 5/2016 | Santoso et al. | |
| 9,401,169 | B1 | 7/2016 | Canchi et al. | |
| 9,595,281 | B2 | 3/2017 | Rajauria et al. | |
| 9,830,942 | B1 * | 11/2017 | Mader | ........... G11B 20/10481 |
| 10,283,145 | B2 | 5/2019 | Rajauria et al. | |
| 10,783,913 | B1 | 9/2020 | Rajauria et al. | |
| 11,699,461 | B1 * | 7/2023 | Valcu | ........... G11B 5/314 |
| | | | | 369/13.2 |
| 2008/0204924 | A1 * | 8/2008 | Ohno | ........... G11B 5/6005 |
| 2008/0273260 | A1 * | 11/2008 | Liu | ........... G11B 5/455 |
| | | | | 360/77.02 |
| 2012/0056612 | A1 * | 3/2012 | Mathew | ........... G11B 5/6029 |
| | | | | 324/76.77 |

(Continued)

OTHER PUBLICATIONS

Ju, et al., "High Density Heat Assisted Magnetic Recording Media and Advanced Characterization—Progress and Challenges", Nov. 2015, IEEE Transactions on Magnetics, vol. 51, No. 11, https://www.researchgate.net/publication/279156059_High_Density_Heat_Assisted_Magnetic_Recording_Media_and_Advanced_Characterization_-_Progress_and_Challenges.

(Continued)

*Primary Examiner* — Peter Vincent Agustin
(74) *Attorney, Agent, or Firm* — NOD Law PC

(57)　　　　　ABSTRACT

A data storage device comprises a disk, a recording head, and a thermal fly-height control (TFC) actuator. Write touchdown is detected by writing a reference pattern to the disk at a target TFC power, reading the reference pattern at operational TFC power, detecting write touchdown when a measured timing jitter exceeds a threshold, and writing additional reference patterns to the magnetic storage medium at incrementally adjusted target TFC powers until write touchdown is detected. For read touchdown detection, the reference pattern is written at a target TFC power and read at operational TFC power, and re-read at incrementally adjusted target TFC powers until read touchdown is detected.

20 Claims, 12 Drawing Sheets

(56) References Cited

U.S. PATENT DOCUMENTS

| 2017/0092313 A1* | 3/2017 | Olson | G11B 5/6035 |
| 2024/0321306 A1 | 9/2024 | Sakoguchi et al. | |

OTHER PUBLICATIONS

Ng et al., "Bi-Directional Pattern-Dependent Noise Prediction for Heat-Assisted Magnetic Recording With High Jitter Noise", Apr. 19, 2012, IEEE Transactions on Magnetics, vol. 48, Issue: 5, pp. 1819-1825, https://ieeexplore.ieee.org/document/6187794.

* cited by examiner

700

SECOND ORDER
CURVE FIT METHOD

READ NT PATTERN — 702

EXTRACT HARMONICS
FROM READBACK
SIGNAL — 704

FIT SECOND ORDER
CURVE TO HARMONICS — 706

ANALYZE CURVE FOR
FREQUENCY SHIFT — 708

DETERMINE WHETHER
FREQUENCY SHIFT
INDICATES TD — 709

DATA STORAGE DEVICE WITH JITTER-BASED TOUCHDOWN DETECTION

BACKGROUND

Data storage devices such as disk drives comprise a magnetic storage medium such as a disk and a recording (read/write) head connected to a distal end of an actuator arm that is rotated about a pivot by an actuator such as a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The actuator typically rotates a number of actuator arms about a pivot in order to simultaneously position a number of recording heads over respective disk surfaces based on the servo data recorded on each disk surface.

FIG. 1 is a conceptual diagram of a conventional disk format 2 comprising a number of servo tracks 4 defined by servo sectors $6_0 \ldots 6_N$ recorded around the circumference of each servo track 4. Each servo sector $6_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $6_i$ further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to the actuator to actuate the recording head radially over the disk in a direction that reduces the PES.

Head-media spacing must be precisely controlled to ensure reliable data recording and retrieval and to minimize mechanical wear and potential damage to the recording head or disk surface. The recording head must operate within an optimal fly height range, close enough to the disk surface to maintain signal integrity but without making unintended contact that could cause wear or damage to the recording head or disk surface. In the context of disk drives, touch-down (TD) refers to the point at which the recording head makes initial frictional contact with the disk surface, which typically occurs when the head-disk spacing is reduced to the point where asperities or the lubricant layer on the disk surface interact with the head, leading to a measurable increase in friction. Touchdown (TD) detection is needed to control and calibrate head-media spacing because it provides a reference point for the minimum fly height. Disk drives have traditionally relied on friction-based methods for touchdown detection. For example, frictional interaction between the head and the media (touchdown) may be detected by analyzing PES variations, such as those measured by YMK, or by analyzing timing variations between servo ID (SID) marks, a technique known as SID-to-SID (S2S) timing.

As demand for greater areal densities has increased, heat-assisted magnetic recording (HAMR) has emerged to enable higher data storage capacities by temporarily heating the recording medium during the write process. A laser integrated into the write head directs laser light to a near-field transducer (NFT), which focuses the laser light onto a tiny spot on the disk surface to lower its magnetic coercivity, allowing data to be written at smaller scales. However, because the NFT is a nanoscale plasmonic device that is vulnerable and highly sensitive to mechanical wear, traditional friction-based methods for touchdown detection and head-media spacing calibration are generally not suitable for disk drives employing HAMR heads.

As an alternative to friction-based methods, techniques that rely on temperature and resistance changes that occur as the head approaches the disk have been developed for touchdown detection in HAMR heads. In some examples, an embedded contact sensor (ECS) and a near-field temperature sensor (NTS) are respectively configured in the read and write portions of the head to detect variations in resistance and temperature as the head approaches the disk. However, because the ECS and NTS do not directly measure frictional contact, they do not provide a true spacing measurement but instead infer spacing based on changes in thermal and electrical properties, which can be affected by environmental factors and transient variations.

The inclusion of any information in this background section should not be construed as an admission that such information constitutes prior art. This background section may describe aspects of the subject invention and related concepts.

SUMMARY

The following summary relates to one or more aspects or embodiments disclosed herein. It is not intended to provide a comprehensive overview of all contemplated aspects or embodiments, nor should it be construed as identifying key or essential features limiting the scope of any particular aspect or embodiment. Rather, this summary presents certain concepts in a simplified form as a prelude to the detailed description that follows.

According to aspects of this disclosure, a high-sensitivity method is provided that detects frictional contact of a recording head with a magnetic storage medium (touchdown) by identifying friction-based phase shifts in timing jitter. This method is particularly beneficial for HAMR heads, which have generally not employed friction-based touchdown detection methods due to the risk of head wear and NFT damage, and have instead relied on indirect methods such as ECS/NTS proximity sensing. By utilizing timing jitter for touchdown detection, more sensitive and accurate touchdown detection is enabled, while avoiding the risks of head wear and damage associated with conventional friction-based touchdown detection methods.

Accordingly, some aspects of this disclosure are directed to a data storage device comprising a magnetic storage medium; a recording head; a thermal fly-height control (TFC) actuator; and one or more processing devices or components, configured individually or in combination, to detect touchdown of the recording head by writing a reference pattern to the magnetic storage medium at a target TFC power; reading the reference pattern written to the magnetic storage medium at an operational TFC power; measuring timing jitter from the read reference pattern; when the measured timing jitter exceeds a threshold, detecting a write touchdown; and when the measured timing jitter does not exceed the threshold, writing additional reference patterns to the magnetic storage medium at incrementally adjusted target TFC powers until the measured timing jitter exceeds the threshold.

In some implementations, the data storage device further comprises an analog-to-digital converter (ADC) buffer that digitizes the read reference pattern, and measuring the timing jitter comprises demodulating the digitized read reference pattern; and applying low-pass filtering to extract phase shift jitter indicative of write touchdown.

In some implementations, measuring the timing jitter comprises converting the read reference pattern to a frequency domain waveform; and analyzing the frequency domain waveform to identify frequency shifts indicative of write touchdown.

In some implementations, measuring the timing jitter comprises extracting harmonic components from the read reference pattern; fitting the extracted harmonic components to a second order curve; and analyzing the second order curve to identify frequency shifts indicative of write touchdown.

In some implementations, the data storage device further comprises a dual arbitrary harmonic sensor (DAHS) configured to simultaneously extract at least six harmonic components from the read reference pattern.

Further aspects of this disclosure are directed to a data storage device comprising a magnetic storage medium; a recording head; a thermal fly-height control (TFC) actuator; and one or more processing devices or components, configured individually or in combination, to detect touchdown of the recording head on the magnetic storage medium by reading, at a target TFC power, a reference pattern written to the magnetic storage medium at an operational TFC power; measuring timing jitter from the read reference pattern; when the measured timing jitter exceeds a threshold, detecting a read touchdown; and when the measured timing jitter does not exceed the threshold, re-reading the reference pattern at incrementally adjusted target TFC powers until the measured timing jitter exceeds the threshold.

Further aspects of this disclosure are directed to a method for detecting touchdown of a recording head on a magnetic storage medium of a data storage device. The method comprises writing a reference pattern to the magnetic storage medium at a target thermal fly-height control (TFC) power; reading the reference pattern written to the magnetic storage medium at an operational TFC power; measuring timing jitter from the read reference pattern; when the measured timing jitter exceeds a threshold, detecting write touchdown; and when the measured timing jitter does not exceed the threshold, writing additional reference patterns to the magnetic storage medium at incrementally adjusted target TFC powers until the measured timing jitter exceeds the threshold.

Further aspects of this disclosure are directed to a method for detecting touchdown of a recording head on a magnetic storage medium of a data storage device. The method comprises reading, at a target thermal fly-height control (TFC) power, a reference pattern written to the magnetic storage medium at on operational TFC power; measuring timing jitter from the read reference pattern; when the measured timing jitter exceeds a threshold, detecting a read touchdown; and when the measured timing jitter does not exceed the threshold, re-reading the reference pattern at incrementally adjusted target TFC powers until the measured timing jitter exceeds the threshold.

Additional aspects of this disclosure are described in greater detail below and are illustrated in the accompanying drawing figures.

BRIEF DESCRIPTION OF THE DRAWINGS

The following description and accompanying drawings illustrate various features and advantages of this disclosure. The drawings are not necessarily to scale, as emphasis is placed on illustrating the principles of the disclosure. Like reference characters may be used to indicate the same components across different figures and views. The drawings provide illustrative examples and should not be construed as limiting the scope of this disclosure.

DETAILED DESCRIPTION

The embodiments described herein are not intended to limit the invention to the precise forms disclosed, nor are they exhaustive. Rather, various embodiments are provided to facilitate understanding by those skilled in the art. The terms 'exemplary' and 'example,' as used herein, refer to instances or illustrations and should not be construed as limiting or as indicating a preferred or advantageous embodiment relative to other embodiments.

Figure 1:
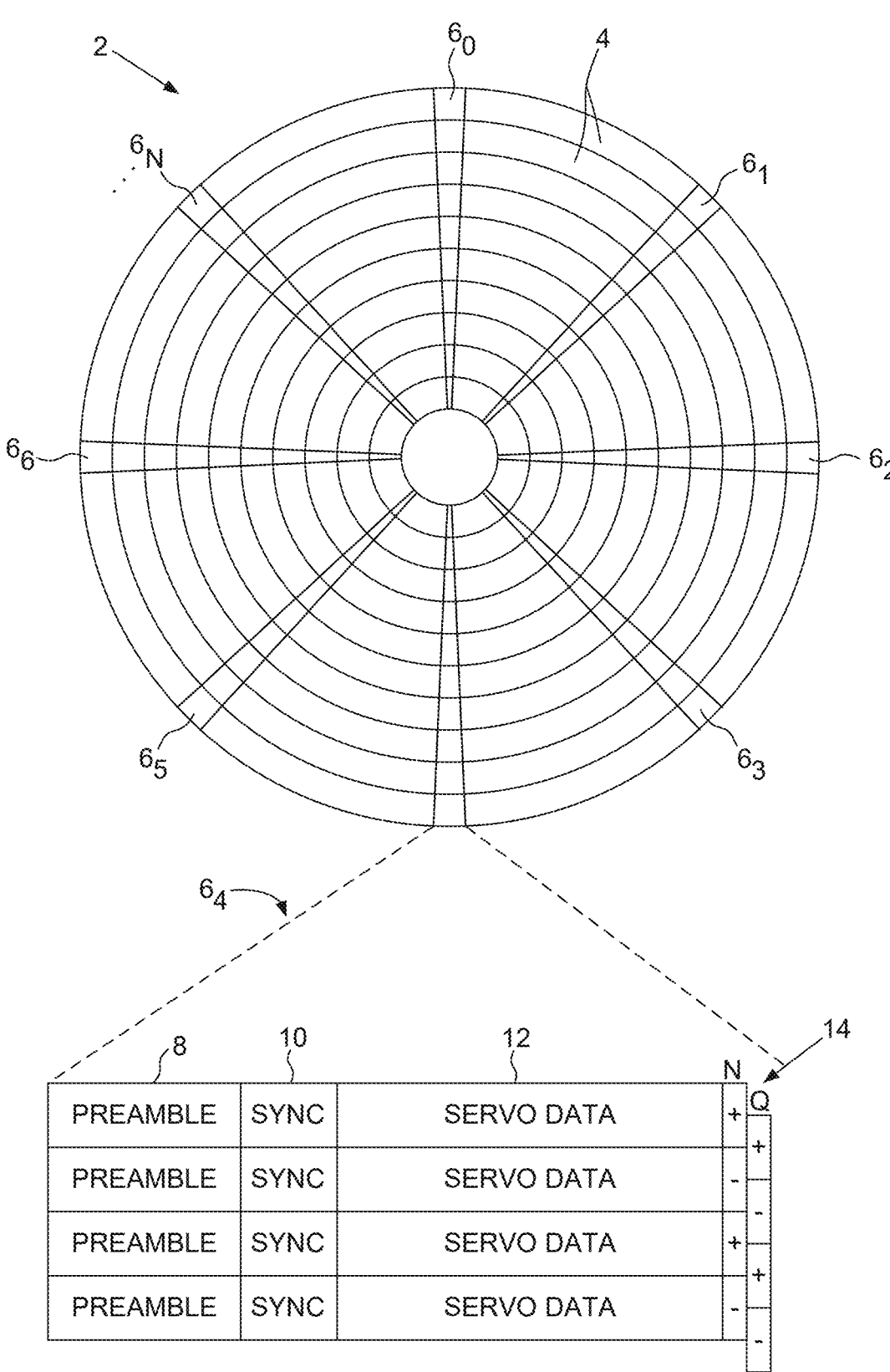
FIG. 1 is a conceptual diagram of a conventional disk format, in accordance with aspects of this disclosure.
Figures 2A, 2B, 2C:
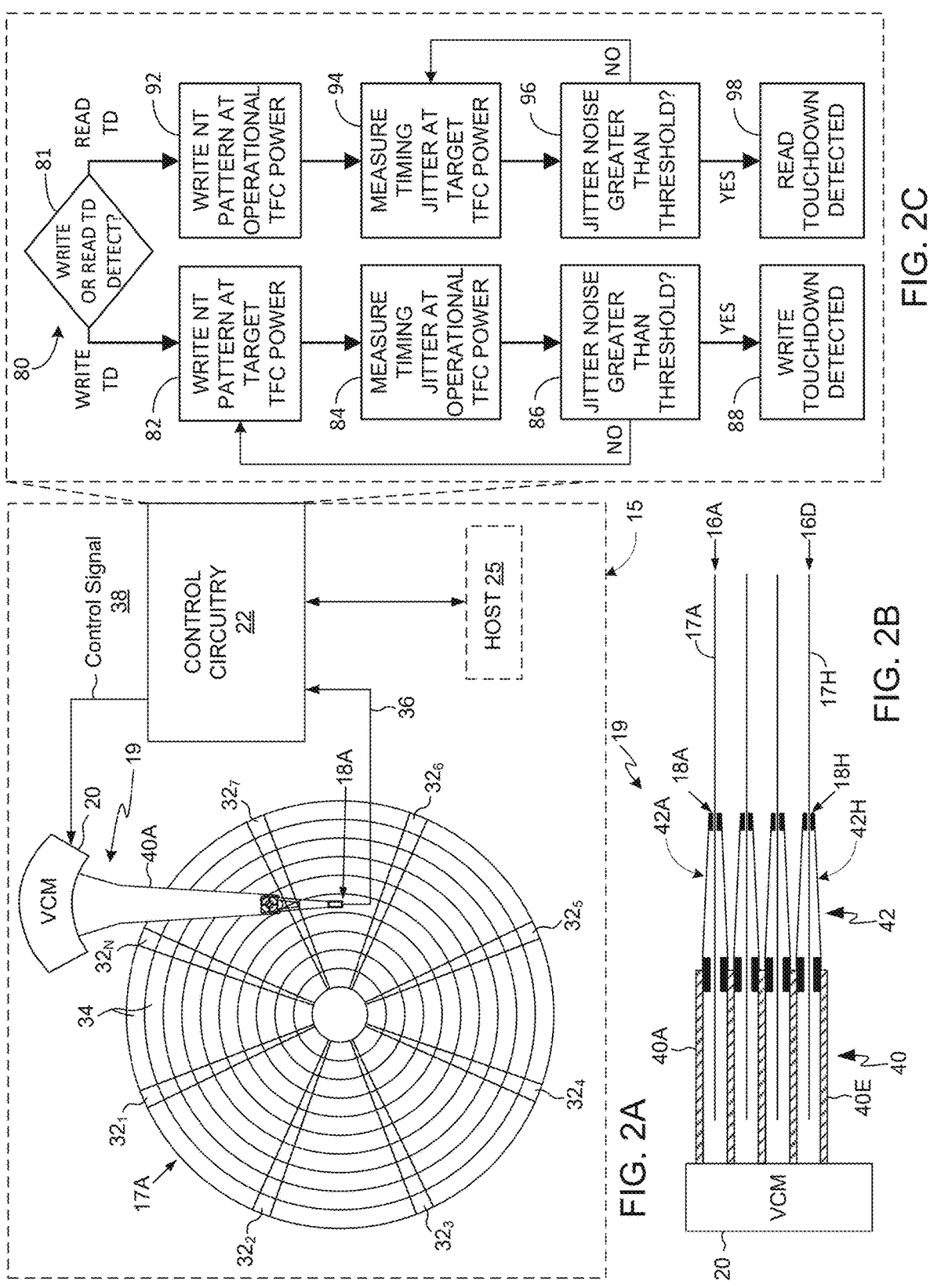
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram illustrating a method for detecting write touchdown and read touchdown in a data storage device, in accordance with aspects of this disclosure.

FIGS. 2A and 2B are conceptual top and side views of a data storage device in the form of hard disk drive (HDD) 15, in accordance with aspects of this disclosure. HDD 15 comprises recording heads 18 (e.g., recording heads 18A . . . 18H) that are actuated and positioned over surfaces 17 (e.g., surfaces 17A . . . 17H) of magnetic storage media 16 (e.g., disks 16A . . . 16D) by actuator assembly 19. Recording heads 18 comprise write and read elements configured for writing and reading data and control features to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured in a slider at a distal end of an actuator arm 40 via a suspension 42 (suspensions 42A . . . 42H). Each actuator arm 40 is configured to suspend a head 18 in close proximity over a corresponding disk surface 17. For example, head 18A is suspended by topmost actuator arm 40A via suspension 42a over topmost disk surface 17A, and head 18H is suspended by lowest actuator arm 40H via suspension 42H over lowest disk surface 17H. FIGS. 2A-B are presented for exemplary purposes only; a wide variety of other numbers of disks, disk surfaces, primary actuators, actuator assemblies, suspensions, and heads are contemplated and may be used.

Control circuitry 22 may be implemented in one or more processing devices, configured individually or in combination, and performs or executes various methods, processes, functions, and tasks to manage and control operation of HDD 15, and in particular to manage and control operation of recording heads 18. For example, positioning data from servo sectors or wedges $32_1$ . . . $32_N$ on disk surfaces 17 included in read signals 36 from recording heads 18 allows control circuitry 22 to determine the position of each head 18 relative to disk surface 17. Based on a position error signal (PES) that represents the difference between the head's actual position and the target track, control circuitry 22 generates control signals 38 that are sent to actuator 20, which adjusts the alignment of heads 18 to maintain accurate tracking over tracks 34.

FIG. 2C is a flow diagram depicting a method 80 performed by control circuitry 22 for detecting head-media contact (touchdown) during write and read operations by extracting and measuring timing jitter, in accordance with aspects of this disclosure. The operational flow of method 80 depends on whether write touchdown detection or read touchdown detection is being performed (step 81). For write touchdown detection, in step 82, an nT pattern is written to the media at a target TFC (thermal fly-height control) power. In step 84, the written nT pattern is read at operational TFC power and timing jitter noise is measured. As will be described in detail below, timing jitter noise may be measured in step 84 using one of multiple methods described herein, including ADC buffer method 500 (FIG. 5A), frequency delta method 600 (FIG. 6A), or second order curve fit method 700 (FIG. 7A). If the measured timing jitter noise is not greater than a predefined threshold (86—NO), then touchdown is not detected and another nT pattern is written to the media at a different (higher) target TFC (step 82) and the timing jitter noise is measured again at the operational TFC (step 84). Steps 82-86 are repeated until the measured timing jitter noise is greater than the predefined threshold (86—YES), in which case touchdown is detected (step 88).

Returning to step 81 of FIG. 2C, if read touchdown detection is being performed, an nT pattern is written to the media at operational TFC power in step 92. The nT pattern may be written onto the media at the time of read, or may be once pre-written to the media. In step 94, the written nT pattern is read at a target TFC power and timing jitter noise is measured. As in write touchdown detection, timing jitter noise may be measured in step 94 using one of multiple methods described herein, including ADC buffer method 500, frequency delta method 600, and second order curve fit method 700. If the measured timing jitter noise is not greater than a predefined threshold (96—NO), touchdown is not detected, and the method returns to step 94 to re-read the nT pattern at a different (higher) target TFC power. Steps 94-96 are repeated until the measured timing jitter noise is greater than the predefined threshold (96—YES), in which case touchdown is detected (step 98).

The steps of touchdown detection method 80, as well as the specific methods for measuring timing jitter noise that are incorporated within touchdown detection method 80—ADC buffer method 500, frequency delta method 600, and second order curve fit method 700—are described in greater detail below.

Figure 3:
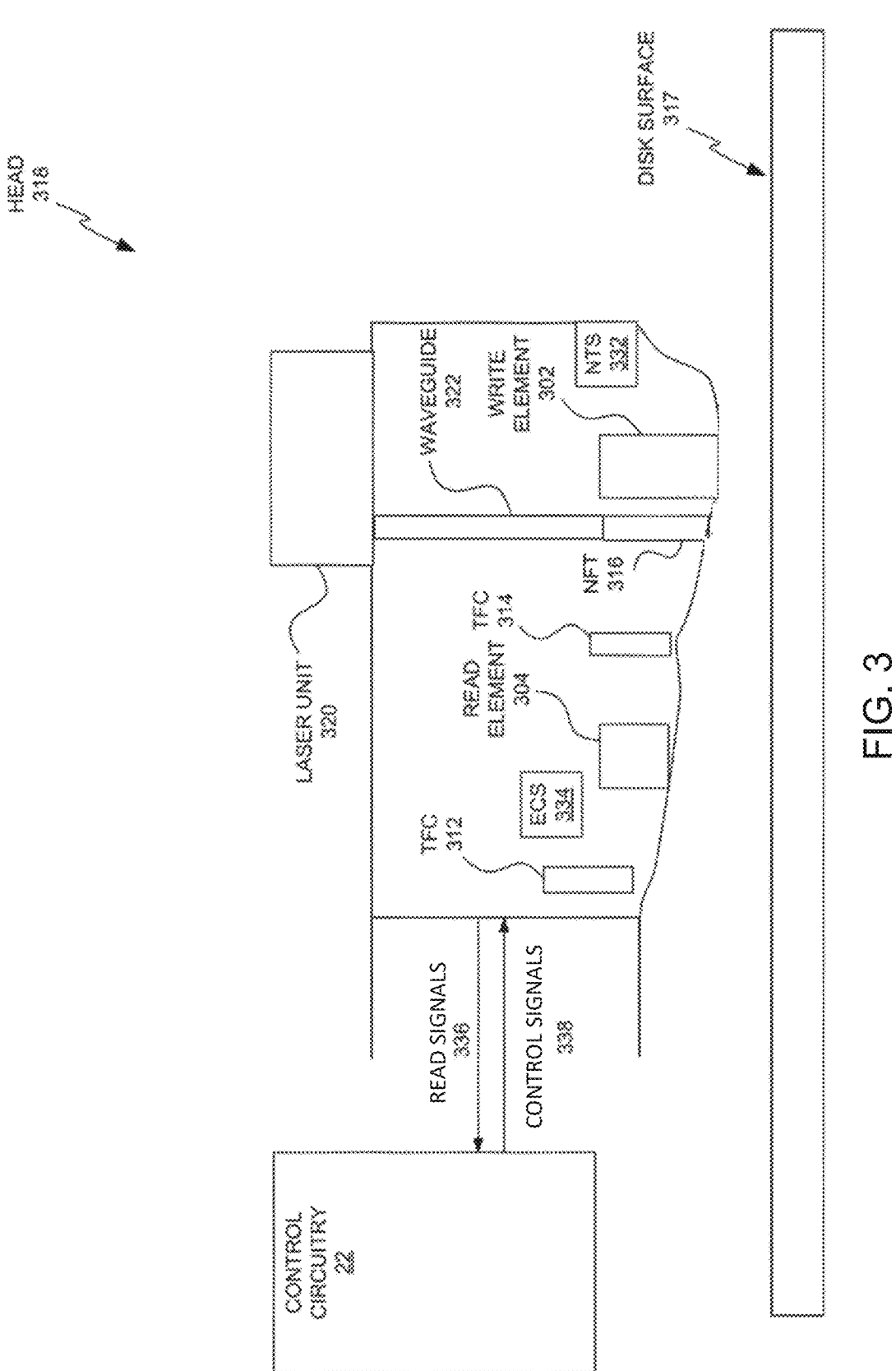
FIG. 3 is a conceptual sectional diagram of a recording head of a data storage device suspended above and operating proximate to a disk surface, in accordance with aspects of this disclosure.

FIG. 3 is a conceptual sectional diagram of a recording head 318 of a data storage device suspended above and operating proximate to a disk surface 317, in accordance with aspects of this disclosure. Head 318 and disk surface 317 are examples of heads 18 and disk surfaces 17 of FIGS. 2A and 2B. Control circuitry 22 outputs control signals 338 to recording head 318 and receives read signals 336 (including data signals, control signals, and thermal condition metrics) from head 318. It should be noted that FIG. 3 is a conceptual diagram and not an engineering schematic, and that the elements depicted in FIG. 3 may be configured in orientations and arrangements other than the example configuration that is shown in FIG. 3.

Recording head 318 comprises write element 302 and read element 304 and is configured for heat-assisted magnetic recording (HAMR). Control circuitry 22 causes data to be written to disk surface 317 by modulating a write current in an inductive write coil in write element 302 to create a magnetic field strong enough to magnetize a bit of magnetic material in disk surface 317 in one direction, representing a binary one, or in an opposite direction, representing a binary zero. Read element 304, typically a magneto resistive (MR) sensor, detects the direction of magnetization in the magnetized bits of disk surface 317 through changes in resistance in the MR sensor. Resistance changes in the MR sensor correspond to the binary one and zero states of the magnetized bits and are converted by control circuitry 22 into readable digital data.

Recording head 318 also comprises thermal fly-height control (TFC) elements such as TFC heaters 312 and 314, which generate localized heat to induce controlled thermal expansion of head 318 towards disk surface 317, enabling precise adjustment of fly height. TFC control refers to the regulation of flying height (FH) by adjusting the power delivered to TFC heaters 312 and 314. When power is applied to the TFC heaters, the region of head 318 surrounding the heaters expands, causing write element 302 and/or read element 304 to protrude incrementally towards disk surface 317. This controlled protrusion is critical not only for optimizing head-disk spacing during normal operation but also for enabling the touchdown detection methods described in this disclosure. In particular, power adjustments to TFC heaters 312 and 314 allow control circuitry 22 to systematically modify head-disk spacing, facilitating detection of touchdown events based on timing jitter noise analysis. The ability to finely control fly height via TFC heaters provides a mechanism for inducing and detecting touchdown conditions in a controlled manner, enabling the precise measurement of timing jitter noise signatures that indicate the onset of touchdown.

HAMR recording head 318 further comprises laser unit 320, which in some examples is a semiconductor laser diode designed to emit light at a wavelength suitable for heating. Waveguide 322 is configured to direct light emitted by laser unit 320 to near-field transducer (NFT) 316, which in some examples is a plasmonic, metallic structure situated near write element 302 that is shaped to concentrate the laser light into a tiny (nanoscale) spot on disk surface 317 where the data needs to be written. This localized heating temporarily reduces the magnetic coercivity of the disk material, such that its magnetic state can be changed with less magnetic energy, thereby allowing write element 302 to write to more closely spaced regions without spreading magnetic influence beyond the target area. By confining each recorded bit to a smaller area, more data can be packed into the same physical space on the disk, such that higher storage densities can be achieved.

The spacing between recording head 318 and disk surface 317 must be precisely controlled to ensure reliable data recording and retrieval and to minimize mechanical wear and potential damage to head 318 or disk surface 317. Recording head 318 must operate within an optimal fly height range, close enough to disk surface 317 to maintain signal integrity but without making unintended contact that could cause wear or damage to head 318 or disk surface 317. Touchdown (TD) refers to the point at which recording head 318 makes initial frictional contact with disk surface 317, which typically occurs when the head-disk spacing is reduced to the point where asperities or a lubricant layer on disk surface 317 interact with head 318, leading to a measurable increase in friction. Touchdown (TD) detection provides a reference point for the minimum fly height, which is needed to control and calibrate the spacing between recording head 318 and disk surface 317.

Disk drives have traditionally relied on friction-based methods for touchdown detection. For example, frictional interaction between the head and the media (touchdown) may be detected by analyzing PES variations, such as those measured by YMK, or by analyzing timing variations between servo ID (SID) marks, a technique known as SID-to-SID (S2S) timing. These methods are sometimes referred to as pulse TFC (dither touchdown), as TFC power is incrementally increased to move the recording head closer to the disk while monitoring the YMK and S2S signals for changes indicative of touchdown. By systematically adjusting head-disk spacing and analyzing the resulting variations in the YMK and S2S signals, pulse TFC enables friction-based detection of the point at which the head interacts with the disk surface.

Touchdown detection in heads configured for HAMR presents unique challenges due to their specialized design and operation. NFT 316 is a highly sensitive optical component that is positioned within nanometers of disk surface 317. Moreover, NFT 316 may be covered by a protective barrier such as a silicon nitride (SiN) window to mitigate against wear and damage, which itself is subject to excessive wear due to its close proximity to disk surface 317. For these reasons, traditional friction-based methods for touchdown detection such as detection of PES/YMK variations and S2S timing are generally not suitable for HAMR heads. As an alternative to friction-based methods, techniques that rely on secondary effects such as temperature and resistance variations as the head approaches the disk have been used to estimate head-disk spacing in HAMR heads. For example, an embedded contact sensor (ECS) 334 may be configured near read element 304 and a near-field temperature sensor (NTS) 332 may be configured near NFT 316 and write element 302 to detect variations in resistance and temperature as head 318 approaches disk surface 17. However, because ECS 334 and NTS 332 indirectly estimate spacing based on the secondary effects of resistance and temperature changes, they do not provide true touchdown detection and spacing measurements and are subject to inherent errors.

In addition to touchdown detection, another important metric to be monitored and measured in HAMR heads is NFT pole tip protrusion (NFTptp), which refers to the amount of thermal protrusion of NFT 316 towards disk surface 317 during writing. Accurate measurement of NFTptp is essential for controlling and calibrating head-disk spacing and preventing excessive wear of NFT 316 and/or its protective SiN window. To estimate NFTptp, over-write methods such as burst write scheme (BWS) have been employed. BWS operates by modulating laser power while performing controlled write operations and then analyzing the signal characteristics of the written data to infer NFT spacing. Like ECS/NTS sensing methods, BWS provides an approximation of NFTptp but not a true head-disk spacing measurement because it does not directly detect frictional or physical contact.

Aspects of this disclosure introduce an alternative approach that measures timing jitter as a direct and highly sensitive indicator of touchdown and head-disk interaction, allowing for more precise touchdown detection and measurement of NFTptp. Timing jitter refers to variations in the expected timing of bit transitions that can arise from inherent sources such as random write phase shift and irregular magnetic grain boundaries. Traditionally, jitter has been treated as an undesirable noise component, and various methods have been developed to compensate for and mitigate its effects. However, as described below, the inventors have recognized that, when properly analyzed, the jitter noise signal reveals a distinct signature associated with touchdown events and thus can serve as an important and highly sensitive metric for touchdown detection.

Figure 4A:
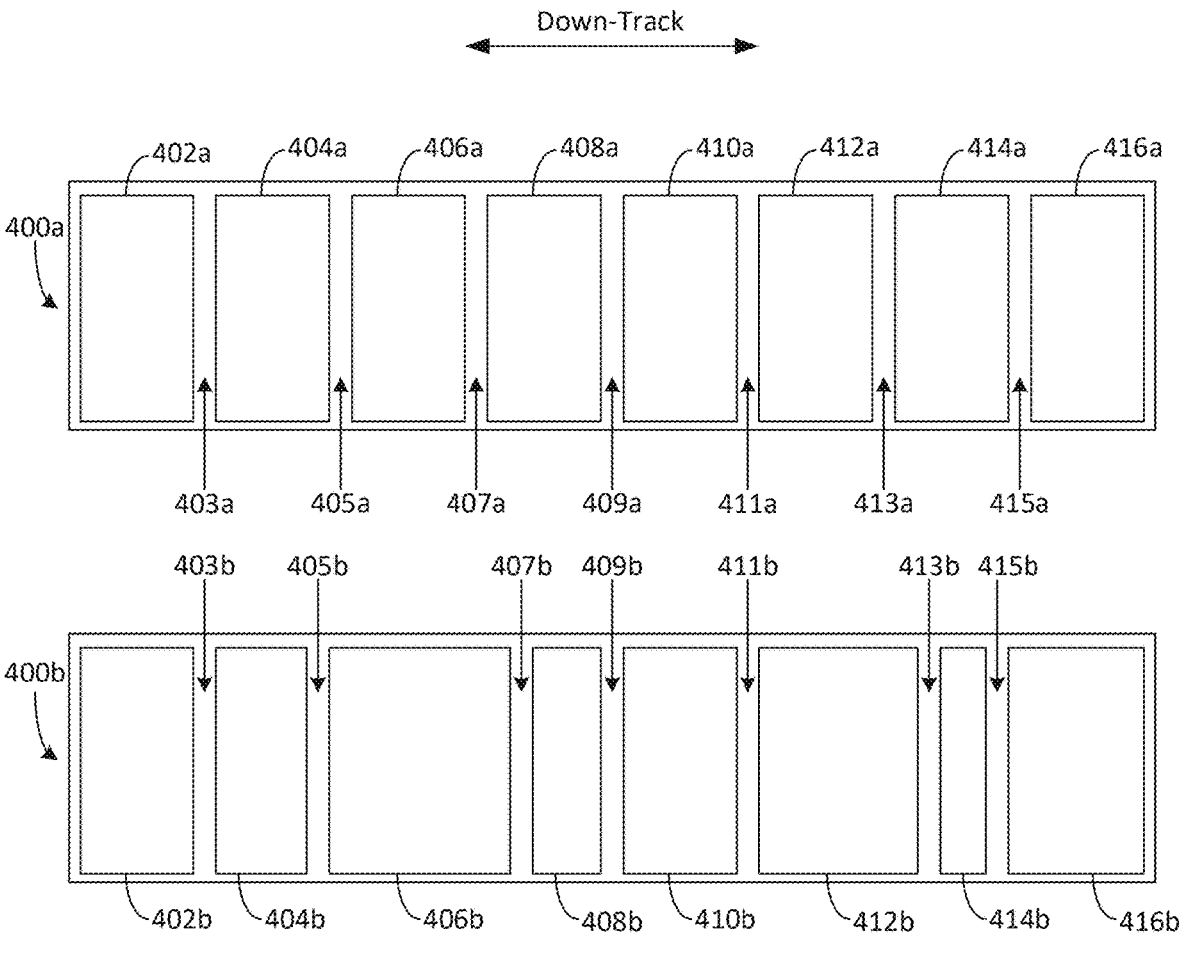
FIG. 4A is a conceptual diagram comparing an idealized nT write pattern with a jitter-affected nT write pattern to illustrate timing jitter arising from write phase shift, in accordance with aspects of this disclosure.

FIG. 4A is a conceptual diagram comparing an idealized write pattern 400a with a jitter-affected write pattern 400b to illustrate timing jitter arising from write phase shift, in accordance with aspects of this disclosure. Ideal write pattern 400a comprises a sequence of bit groups 402a, 404a, 406a, 408a, 410a, 412a, 414a, and 416a, each representing a recurring nT bit pattern written to the media at precise, evenly spaced intervals. Jitter-affected write pattern 400b comprises corresponding bit groups 402b, 404b, 406b, 408b, 410b, 412b, 414b, and 416b, each containing the same nT bit pattern, but with random variations in the expected timing of transitions between bit patterns (jitter) due to the effects of write phase shift.

In magnetic recording, nT bit patterns refer to sequences of bits where transitions occur at regular intervals defined by integer multiples of the fundamental bit period T, where T represents the duration of a single bit. A 2T pattern, for example, is a bit sequence where transitions occur every two clock cycles, forming a periodic structure such as 10 10 10 10. Similarly, a 3T pattern has transitions occurring every three clock cycles, producing a repeated sequence such as 100 100 100 100. Each nT bit sequence may contain any valid n-bit combination, such as 100, 010, or 110, provided that transitions between them follow the expected periodicity. These structured nT patterns serve as reference timing markers, allowing for the detection of deviations caused by timing jitter.

In the example of FIG. 4A, idealized pattern 400a is free of jitter, meaning that its transition shifts 403a, 405a, 407a, 409a, 411a, 413a, 415a occur at precisely defined intervals that align with the expected timing. In contrast, jitter-affected pattern 400b exhibits timing deviations in its transition shifts 403b, 405b, 407b, 409b, 411b, 413b, 415b. Jitter-affected transition shift 405b occurs earlier than its corresponding ideal transition shift 405a, for example, while jitter-affected transition shift 407b occurs later than its ideal counterpart 407a. Similarly, transition shift 413b is delayed compared to 413a, while transition shift 415b occurs prematurely relative to 415a. These deviations in transition timing indicate the presence of write phase shift jitter.

Figure 4B:
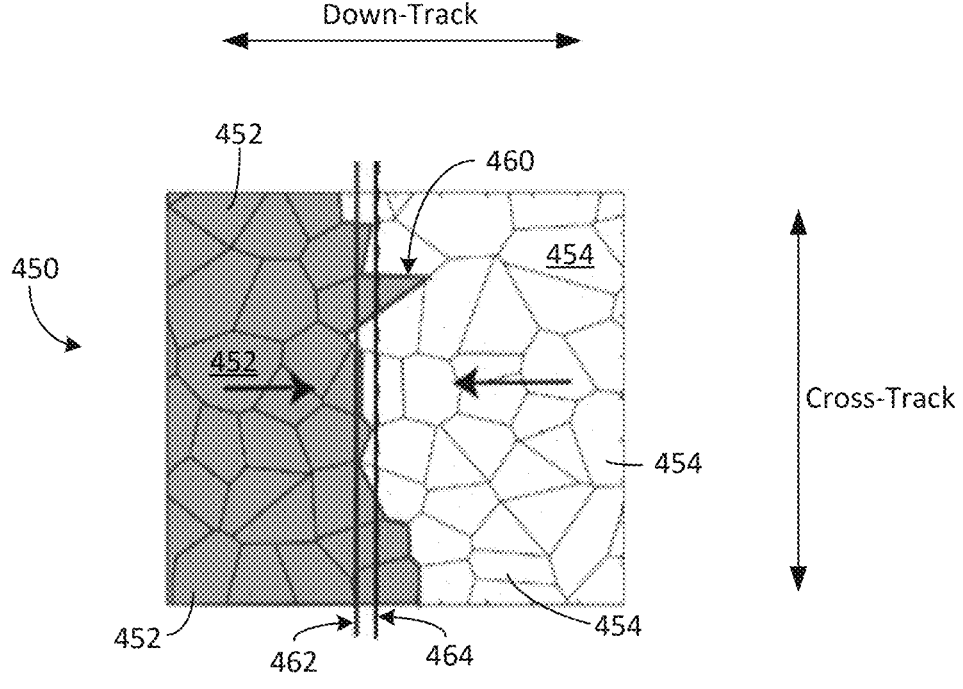
FIG. 4B is a conceptual diagram illustrating irregular magnetic grain boundaries that may give rise to zigzag jitter noise, in accordance with aspects of this disclosure.

Random variations in the expected timing of bit transitions may also arise from irregular magnetic grain boundaries, which is known as zigzag noise. FIG. 4B is a conceptual diagram 450 illustrating irregular magnetic grain boundaries that may give rise to zigzag jitter noise, in accordance with aspects of this disclosure. Inherent randomness in the size, shape, and distribution of magnetic grains causes deviations from the expected timing of bit transitions. Data transitions occur at precisely defined boundaries in idealized conditions, but grain-to-grain variability causes the actual transition position to fluctuate, leading to timing jitter.

In FIG. 4B, reference number 460 denotes the actual transition boundary between grains 452 on the left side and grains 454 on the right side. Due to the irregular shapes and arrangements of grains 452, 454, actual transition boundary 460 does not always align with ideal transition boundary 462, which is the theoretical position where the bit transition would occur in a perfectly uniform medium. Instead, the actual recorded transitions vary from grain-to-grain and can be represented as an average transition boundary 464. Deviations between ideal transition boundary 462 and actual average transition boundary 464 manifest as another form of timing jitter noise.

The inventors have recognized that, in addition to these inherent sources of jitter noise, analysis of the jitter noise signal reveals a distinct signature associated with touchdown events. When touchdown occurs, the mechanical interaction between the recording head and the disk surface induces additional timing jitter that is distinct from random write phase shift variations (FIG. 4A) and media-induced jitter (FIG. 4B). In particular, touchdown frictional contact causes a phase shift in the transitions between bit patterns, i.e., they are delayed or occur early. By analyzing the jitter noise signal, it is possible to distinguish these frictionally-induced transition shifts, providing a highly sensitive, friction-based method for detecting touchdown and measuring NFT spacing.

According to aspects of this disclosure, several exemplary and non-limiting methods for extracting and measuring phase variations associated with jitter noise from a recorded nT pattern on a magnetic storage medium are described. These methods include ADC buffer method 500 (FIG. 5A), which extracts jitter noise using full waveform digitization and demodulation to isolate phase variations caused by touchdown-induced jitter; frequency delta method 600 (FIG. 6A), which extracts jitter noise using frequency variations in the sinc function centered around the target frequency; and second order curve fit method 700 (FIG. 7A), which extracts jitter noise by fitting multiple harmonics to a second-order polynomial curve and analyzing frequency shifts. These are merely exemplary methods for extracting jitter noise from a recorded nT pattern; other suitable methods may alternatively be employed.

Figure 5A:
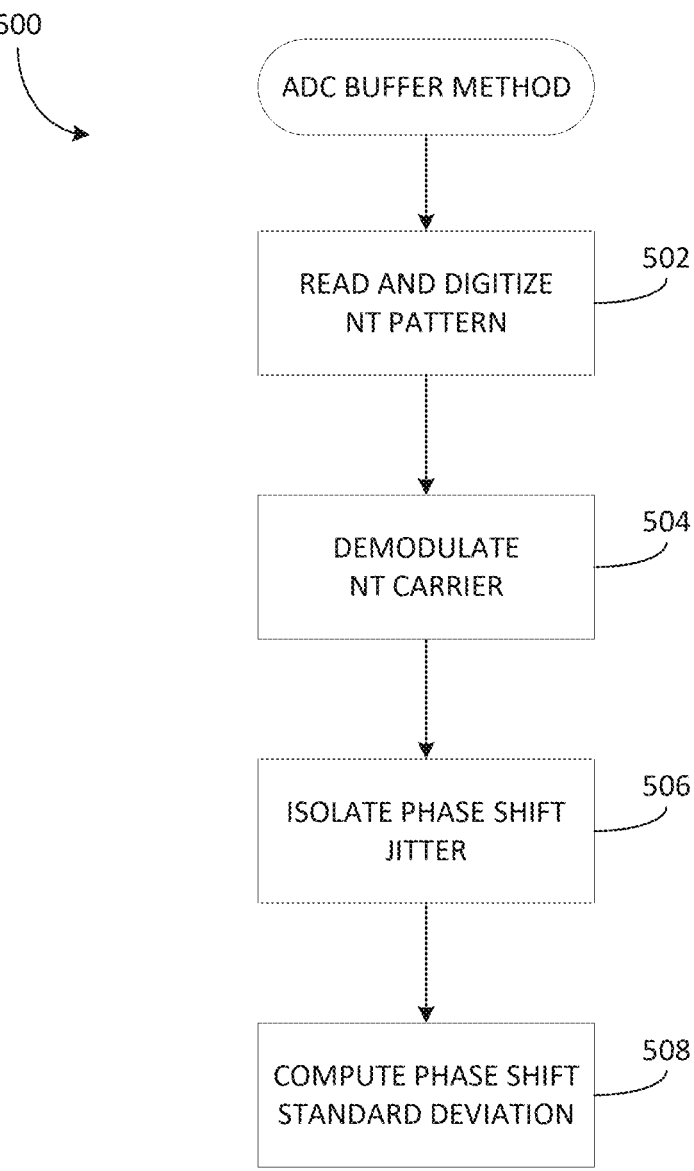
FIG. 5A is a flow diagram illustrating an ADC buffer method for extracting and measuring jitter noise, in accordance with aspects of this disclosure.

FIG. 5A is a flow diagram illustrating an ADC buffer method 500 for extracting and measuring jitter noise from an nT pattern, in accordance with aspects of this disclosure. ADC buffer method 500 may be performed, for example, as part of timing jitter measurement steps 84 and 94 in touchdown detection method 80 of FIG. 2C. In step 502, a reference nT pattern written onto the recording medium (disk surface 317) is read by recording head 318, generating an analog readback signal (e.g., read signals 336). The analog readback signal is then converted into a high-resolution digital signal and temporarily stored in an ADC buffer for further processing. The ADC buffer is part of the read channel, which converts magnetic transitions on disk surface 317 that are detected by recording head 318 into a digital data stream. Both the ADC buffer and the read channel are components of control circuitry 22, which in some examples may be physically integrated into the pre-amplifier electronics. Phase shifts caused by jitter noise are preserved by the ADC buffer in the digitized nT pattern (which acts as a carrier), allowing for their demodulation and analysis in subsequent steps.

The nT carrier signal, which contains both the nT reference pattern and jitter-induced phase variations, may be represented as $\sin(\theta_1)$. In step 504, control circuitry 22 demodulates the nT carrier signal by multiplying it with an unmodulated reference signal, which may be represented as $\sin(\theta_2)$. Mathematically, the multiplication of the nT carrier signal and the unmodulated reference signal follows the trigonometric identity:

$$\sin(\theta_1)\sin(\theta_2) = \frac{1}{2}\cos(\theta_1 - \theta_2) - \frac{1}{2}\cos(\theta_1 + \theta_2)$$

This multiplication produces two frequency components. The difference term, $$\frac{1}{2}\cos(\theta_1 - \theta_2),$$

represents the low-frequency phase difference between the nT reference pattern and the unmodulated reference signal. The difference term contains the desired phase information related to jitter and is used for subsequent analysis. The sum term $$\frac{1}{2}\cos(\theta_1 + \theta_2),$$

represents a high-frequency component at approximately twice the carrier frequency. The sum term does not contribute useful jitter-related information and is removed in step 506.

In step 506, control circuitry 22 isolates and extracts phase shift jitter by applying low-pass filtering to remove the unwanted high-frequency sum term produced during demodulation. The low-pass filter eliminates frequency components near twice the carrier frequency, which arise from the sum term in demodulation step 504, such that only relevant phase variations remain in the extracted signal. Additionally, DC blocking is applied to remove any DC offset component that may be present in the signal. A DC offset represents a constant shift in the signal's amplitude and does not correspond to actual phase variations due to jitter. If left unfiltered, the offset could introduce a signal bias, potentially distorting jitter measurements. By eliminating both the high-frequency sum term and any DC offset, the resulting extracted jitter signal retains only the low-frequency phase variations associated with jitter noise.

Figures 5B, 5C, 5D, 5E, 5F:
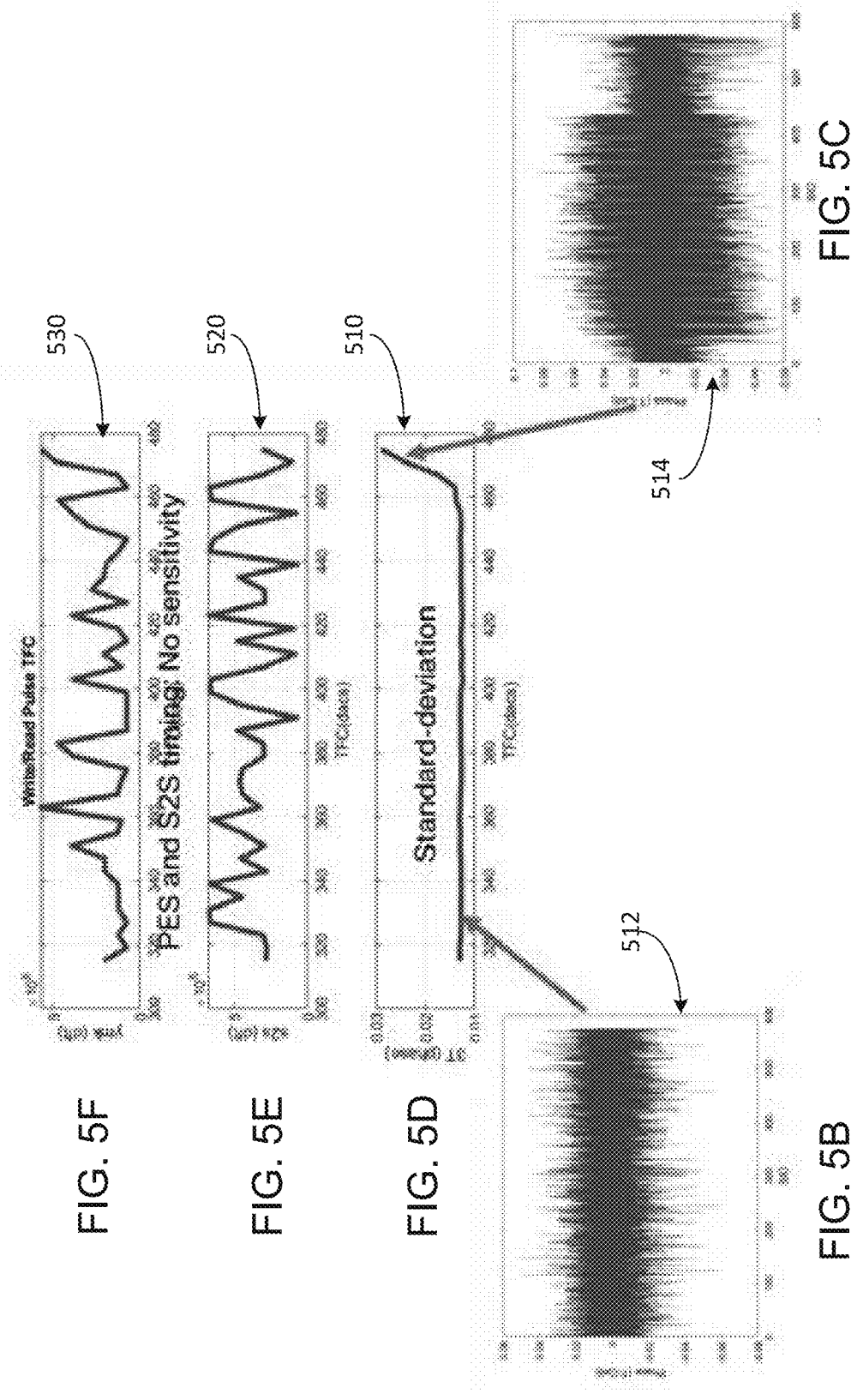
FIG. 5B is a graph plotting phase or jitter noise versus servo ID (SID) position at lower TFC power levels, in accordance with aspects of this disclosure.
FIG. 5C is a graph plotting phase or jitter noise versus SID position at higher TFC power levels, in accordance with aspects of this disclosure.
FIG. 5D is a graph plotting phase shift standard deviation as a function of TFC power, in accordance with aspects of this disclosure
FIG. 5E is a graph plotting a SID-to-SID (S2S) signal as a function of TFC power, in accordance with aspects of this disclosure.
FIG. 5F is a graph plotting a YMK signal as a function of TFC power, in accordance with aspects of this disclosure.

In step 508, as graphically illustrated in FIGS. 5B-5D, control circuitry 22 analyzes the extracted jitter signal by determining the standard deviation of phase shifts across a range of thermal fly-height control (TFC) power levels. The TFC power levels span from low levels where recording head 318 flies safely above disk surface 317 to high levels where head 318 approaches or reaches touchdown. By plotting phase noise standard deviation as a function of TFC power, as in FIG. 5D, a distinct trend emerges. At lower TFC power levels, phase variations remain relatively stable, as head 318 maintains a controlled fly height with only minor jitter contributions from inherent noise sources such as random write phase shift and zigzag noise. At higher TFC power levels, as head 318 moves closer to disk surface 317 and mechanical interactions increase, the phase noise standard deviation exhibits an upward bend, indicating a rise in friction-based jitter. This characteristic upward bend serves as a signature of touchdown, providing a clear, quantifiable metric for touchdown detection.

FIGS. 5B-5D present graphical analyses of the jitter signal extracted using ADC buffer method 500 over a range of thermal fly-height control (TFC) power levels, demonstrating how phase shift variations evolve as recording head 318 transitions from non-touchdown to touchdown conditions.

FIG. 5B is a graph 512 plotting phase or jitter noise versus servo ID (SID) position at lower TFC power levels, corresponding to a non-touchdown range. In this range, recording head 318 flies safely above disk surface 317. As shown in FIG. 5B, phase variations in this range are stable and primarily reflect inherent jitter sources such as random write phase shift (FIG. 4A) and zigzag noise (FIG. 4B). Because there is no significant mechanical interaction between head 318 and disk surface 317 at these lower TFC levels, mechanically induced jitter remains negligible.

FIG. 5C is a graph 514 plotting phase noise versus SID position at higher TFC power levels. As TFC power increases, head 318 moves closer to disk surface 317, eventually approaching or reaching frictional touchdown. In this range, as shown in FIG. 5C, there is a marked increase in phase noise variability. This variability arises from friction-based jitter caused by mechanical interactions between head 318 and disk surface 317, leading to greater fluctuations in phase noise compared to the stable conditions at lower TFC levels.

FIG. 5D is a graph 510 plotting phase shift standard deviation as a function of TFC power, in accordance with aspects of this disclosure. Graph 510 expresses the phase noise measurements of FIGS. 5B and 5C in terms of standard deviation to quantify the magnitude of jitter fluctuations across different TFC power levels. As shown in FIG. 5D, phase shift standard deviation remains relatively stable at lower TFC power levels, where head 318 is flying above disk surface 317 and phase noise is primarily influenced by inherent jitter sources such as random write phase shift and zigzag noise. As TFC power increases and head 318 approaches frictional touchdown, mechanically induced jitter becomes a dominant factor, causing an upward bend in the standard deviation curve. This distinct transition occurs at approximately 460 TFC DACs, marking the onset of touchdown. This characteristic upward bend in the standard deviation curve serves as a signature of touchdown, providing a reliable and repeatable indicator for detecting touchdown events.

The extracted jitter noise signal provides significantly greater touchdown detection sensitivity compared to traditional friction-based methods, such as servo ID-to-servo ID (S2S) timing and position error signal-based (YMK) analysis. These techniques rely on macroscopic position error signal variations, which lack the fine-grained sensitivity needed for early touchdown detection. In this regard, FIG. 5E is a graph 520 plotting the discrete Fourier transform (DFT) of the S2S signal, and FIG. 5F is a graph 530 plotting the DFT of the YMK signal over the same range of TFC power levels as shown in FIG. 5D. As can be seen in FIGS. 5E and 5F, neither the S2S signal nor the YMK signal exhibits a discernible touchdown signature across the tested TFC power range. Unlike the jitter-based analysis, which produces a clear and repeatable upward bend in phase shift standard deviation (FIG. 5D) at approximately 460 TFC DACs signaling the onset of touchdown, S2S- and YMK-based methods fail to show meaningful variations that correlate with the touchdown-induced mechanical interactions discernible from the jitter noise signal.

Figure 6A:
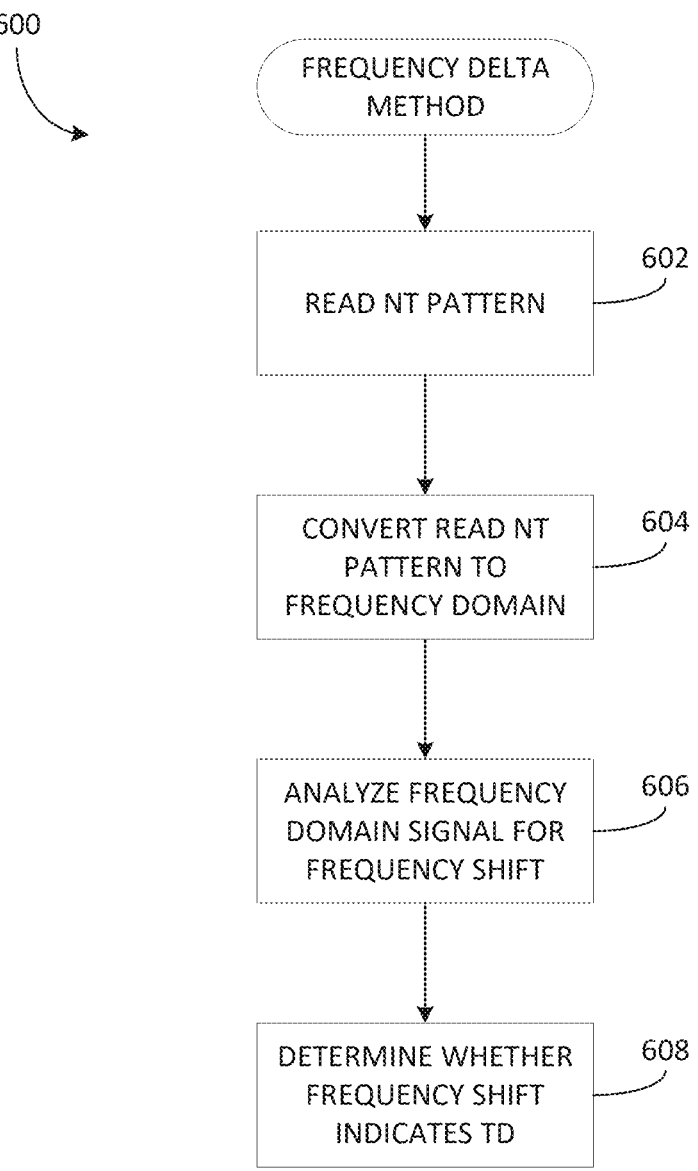
FIG. 6A is a flow diagram illustrating a frequency delta method for extracting and measuring jitter noise, in accordance with aspects of this disclosure.
Figure 7A:
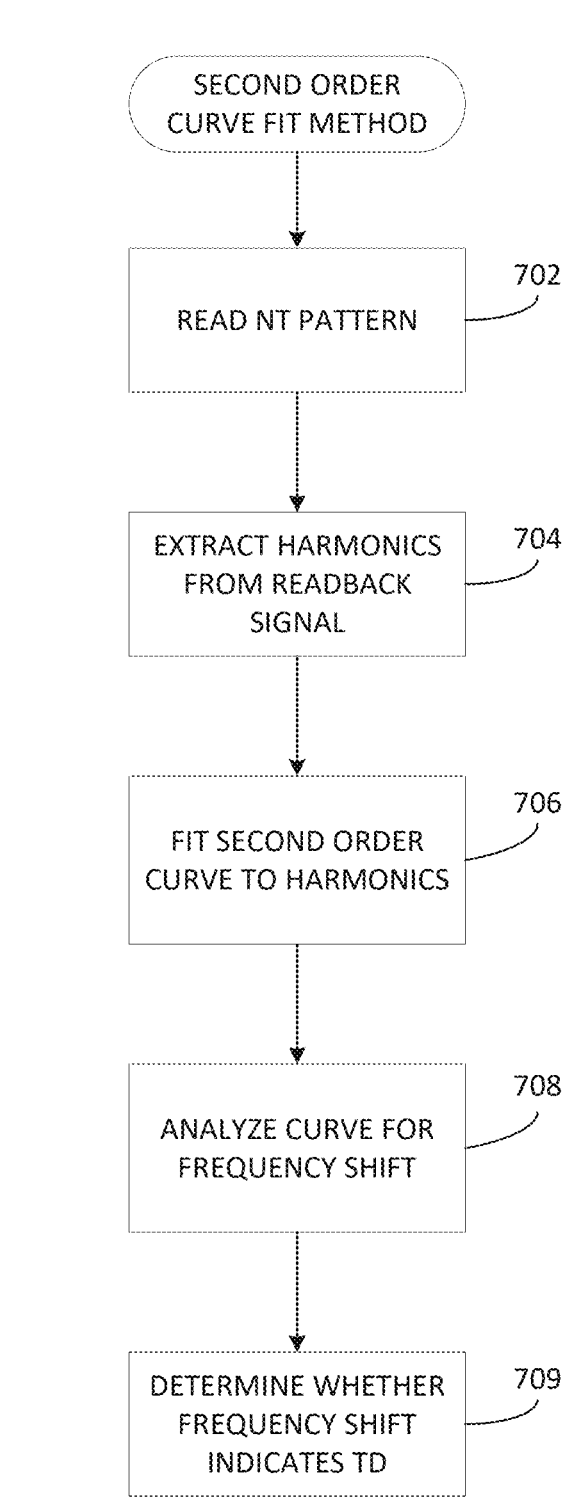
FIG. 7A is a flow diagram illustrating a second order curve fit method for extracting and measuring jitter noise, in accordance with aspects of this disclosure.

FIG. 6A is a flow diagram illustrating another method 600 for extracting jitter noise from an nT pattern, in accordance with aspects of this disclosure. Method 600, referred to as the frequency delta method, extracts jitter noise by analyzing frequency variations in the nT pattern read from the media. Frequency delta method 600 may be performed, for example, as part of timing jitter measurement steps 84 and 94 in touchdown detection method 80 of FIG. 2C. Unlike ADC buffer method 500, which undertakes full waveform digitization and phase demodulation, frequency delta method 600 operates directly in the frequency domain and focuses on a targeted subset of frequency domain data rather than processing the entire waveform. Consequently, frequency delta method 600 has significantly reduced computational overhead and signal processing latency as compared to the full bandwidth processing of ADC buffer method 500.

In step 602 of frequency delta method 600, recording head 318 reads an nT pattern previously written at a target frequency $\omega_0$ from disk surface 317, capturing a time-limited analog readback signal in the time domain. The signal is time-limited because data acquisition occurs over a discrete interval, such as a servo ID (SID) or wedge,

US 12,633,307 B1

Figure 6B:
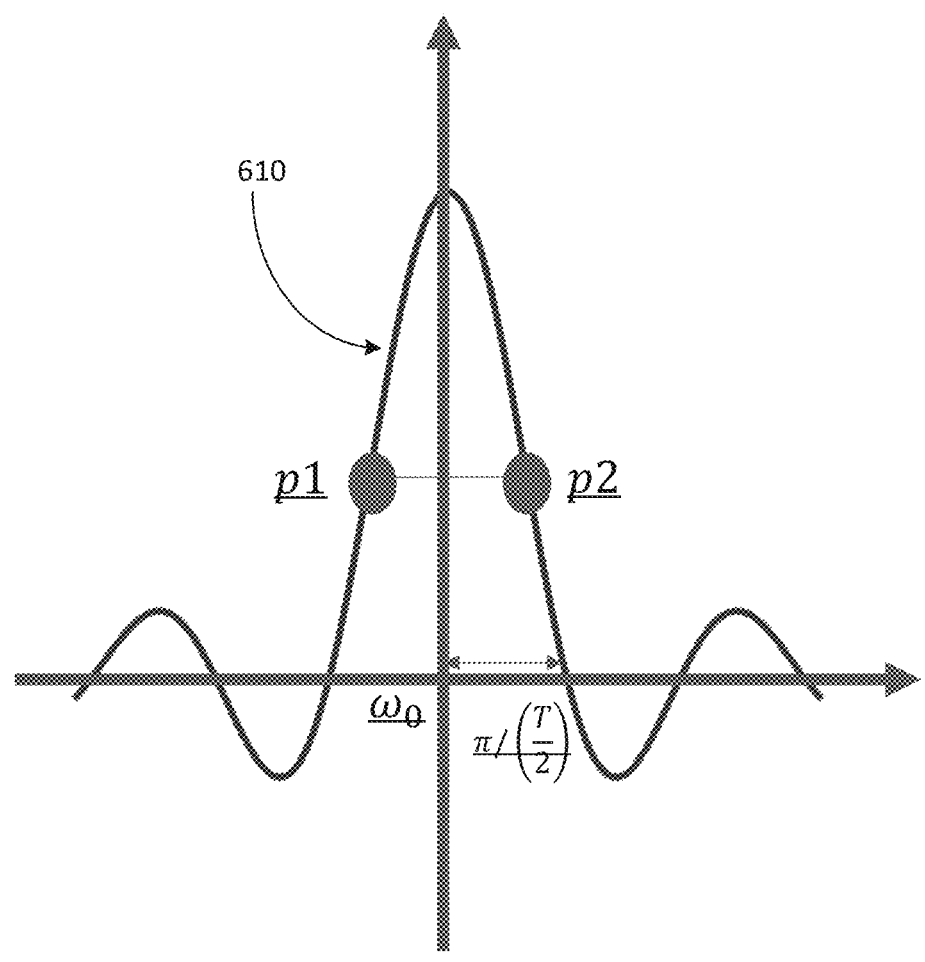
FIG. 6B is a conceptual diagram illustrating a sinc function of a read nT pattern in the frequency domain, in accordance with aspects of this disclosure.

13 restricting the total duration of the captured waveform. In the time domain, the analog readback signal can be represented as a finite-duration sinusoidal function, mathematically expressed as:

$$f(t) = \sin(\omega_0 t), -\frac{T}{2} \le t \le \frac{T}{2}$$

where T represents the total time window over which the signal is acquired. Because the signal is not infinitely long, its spectral representation will not be a single discrete frequency spike but will instead exhibit a characteristic sinc function in the frequency domain when transformed in step 604. In step 604, control circuitry 22 converts the read nT pattern to the frequency domain, for example, by using a Fourier transform. Because the read nT pattern is time-limited by the duration of data acquisition per SID or wedge, rather than comprising a single discrete frequency spike, its spectral representation spreads out into a sinc-shaped curve from a central peak at the target frequency $\omega_0$. The sinc function 610 of the readback nT pattern in the frequency domain is illustrated in FIG. 6B and may be represented mathematically as:

$$F(\omega) = 2\frac{\sin(\omega - \omega_0)\frac{T}{2}}{\omega - w_0}$$

where T represents the total time window over which the signal is acquired. In step 606, control circuitry 22 analyzes the frequency domain sinc function to detect any frequency shifts indicative of jitter. In particular, reference points p1 and p2 (FIG. 6B) are identified along the sloping sides of the central peak at target frequency $\omega_0$ of sinc function 610. Points p1 and p2 are strategically chosen to monitor frequency shifts in target frequency $\omega_0$ that may occur due to frictional contact such as touchdown. Under stable conditions, p1 and p2 exhibit minimal changes, maintaining symmetry around target frequency $\omega_0$. When jitter is introduced, such as from frictional or mechanical vibrations associated with touchdown, sinc function 610 may shift slightly in frequency such that the amplitudes and relative positions of p1 and p2 are also slightly shifted.

The frequency amplitude difference between reference points p1 and p2, referred to as Δf or the frequency delta, serves as a quantitative metric for touchdown detection. When the standard deviation of the frequency delta is plotted against TFC power, an upward bend in the frequency delta standard deviation curve emerges at higher TFC power levels, where mechanically induced jitter becomes a dominant factor. This upward bend is a characteristic signature of touchdown and serves as a reliable indicator of head-media contact. Similar to the phase shift standard deviation trends observed in FIG. 5D for ADC buffer method 500, the frequency delta method exhibits a distinct transition in frequency stability as TFC power is increased beyond a threshold. In step 608, control circuitry 22 evaluates the magnitude of the detected frequency delta and compares it to a predefined threshold to determine whether it is sufficient to indicate touchdown. If the frequency delta exceeds the threshold, touchdown is confirmed. The implementation of method 600 within the broader framework of touchdown detection is further described in connection with method 80 of FIG. 2C.

In frequency delta method 600, control circuitry 22 detects frequency shifts attributable to touchdown-induced jitter noise by analyzing the sinc function of the readback signal centered around the target frequency $\omega_0$. This approach is a streamlined alternative to the full waveform digitization and demodulation employed by ADC buffer method 500, reducing computational complexity and processing time while still enabling touchdown detection. However, frequency delta method 600 is inherently limited in that it tracks frequency shifts in only the fundamental (target) frequency response. According to further aspects of this disclosure, second-order curve fit method 700 (FIG. 7A) is provided that expands upon the frequency delta approach by evaluating multiple harmonic frequency components of the readback signal. By analyzing frequency shifts across multiple harmonics, rather than just at the target frequency, second-order curve fit method 700 provides a robust, noise-resistant measurement of touchdown-induced jitter noise, improving detection accuracy and signal-to-noise ratio (SNR).

Figure 7B:
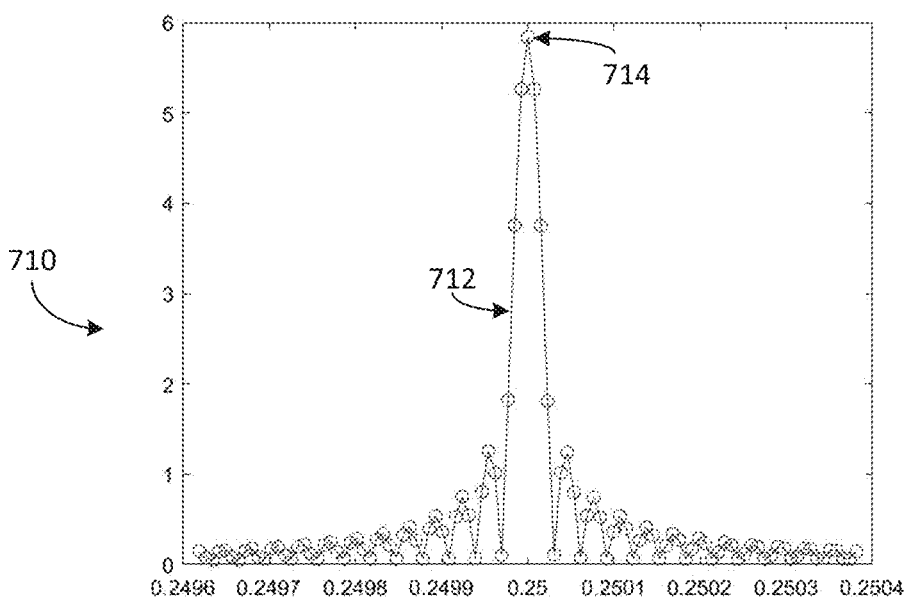
FIG. 7B is a conceptual diagram illustrating the discrete Fourier transform (DFT) response of a readback signal and its resulting sinc function shape, in accordance with aspects of this disclosure.

FIG. 7A is a flow diagram illustrating second-order curve fit method 700 for extracting jitter noise from a readback nT pattern, in accordance with aspects of this disclosure. Method 700 extracts jitter noise by fitting multiple harmonics of a read nT pattern to a second-order polynomial curve and analyzing the curve for frequency shifts. Second order curve fit method 700 may be performed, for example, as part of timing jitter measurement steps 84 and 94 in touchdown detection method 80 of FIG. 2C. In step 702, recording head 318 reads a previously written nT pattern from disk surface 317, capturing a time-limited analog readback signal. Since data acquisition is time-limited to a single servo ID (SID) window, the frequency-domain representation of the readback signal takes the form of a sinc function centered at target frequency $\omega_0$. FIG. 7B is a graph 710 illustrating the discrete Fourier transform (DFT) response of the readback signal and its resulting sinc function shape 712. The central peak 714 of sinc function 712 corresponds to the fundamental (target) frequency $\omega_0$, while the surrounding lobes represent spectral leakage due to time-limited data acquisition.

In step 704, control circuitry 22 extracts multiple harmonics from the readback signal to facilitate jitter noise analysis. Traditionally, harmonics are extracted by computing the DFT of the signal over a predefined frequency range and identifying harmonic peaks corresponding to integer multiples of the fundamental frequency. Once identified, each harmonic component is isolated using bandpass filtering, followed by amplitude and phase analysis to extract jitter-induced deviations. While effective, this manual approach is computationally intensive and requires significant processing time. Advantageously, many modern disk drives include a dedicated hardware feature known as a dual arbitrary harmonic sensor (DAHS) that streamlines the harmonic extraction process. The DAHS is an internal discrete Fourier transform (DFT) analyzer integrated into the read channel, functioning as a built-in spectrum analyzer that can instantly provide up to eight harmonic components per SID. By obtaining these harmonics from directly from the DAHS, rather than computing them manually through DFT operations, control circuitry 22 significantly reduces processing overhead, enabling faster and more efficient jitter measurement.

Figure 7C:
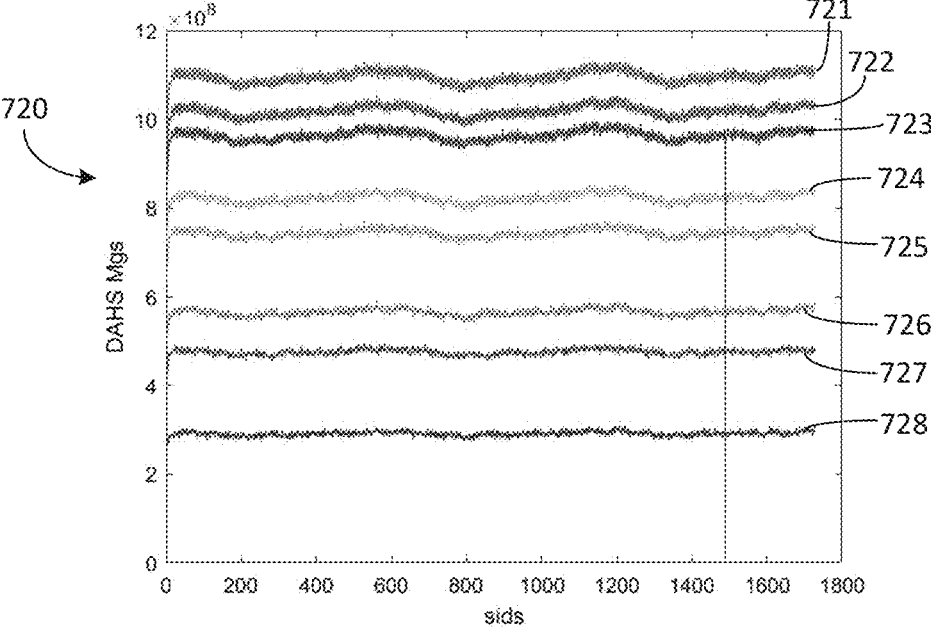
FIG. 7C is a graph illustrating multiple harmonic signals extracted from a readback nT pattern, in accordance with aspects of this disclosure.

FIG. 7C is a graph 720 illustrating raw harmonic signals 721-728 extracted by the DAHS from a 3T data pattern over multiple disk revolutions. In the example of FIG. 7C, graph 720 plots harmonic amplitude (y-axis) versus SID position (x-axis) for eight different harmonic components 721-728, each corresponding to a distinct integer multiple of the fundamental frequency. These harmonics may be directly generated by the read channel DAHS or, alternatively, manually extracted from the readback signal by control circuitry 22 using conventional DFT-based techniques.

In step 706, control circuitry 22 applies a second-order polynomial fit to the harmonic amplitude data extracted in step 704. Step 706 is graphically illustrated in graph 730 of FIG. 7D, where second-order curve 732 is fit to harmonic amplitude data 721-728 (from FIG. 7C), generating a parabolic curve that models the sinc function shape around the target or fundamental frequency $\omega_0$. Graph 730 plots harmonic amplitude (y-axis) versus harmonic number delta from the target or fundamental frequency (x-axis), where zero represents the fundamental frequency $\omega_0$. The polynomial fit follows the general equation $y=ax^2+bx+c$. The estimated frequency shift is determined by locating the maximum amplitude of the polynomial fit, which corresponds to the zero crossing of its first derivative (i.e., where $dy/dx=0$). By using multiple harmonics instead of relying on a single frequency component, this polynomial fitting method significantly improves signal-to-noise ratio (SNR) and enhances the robustness of the frequency shift measurement.

Figure 7D:
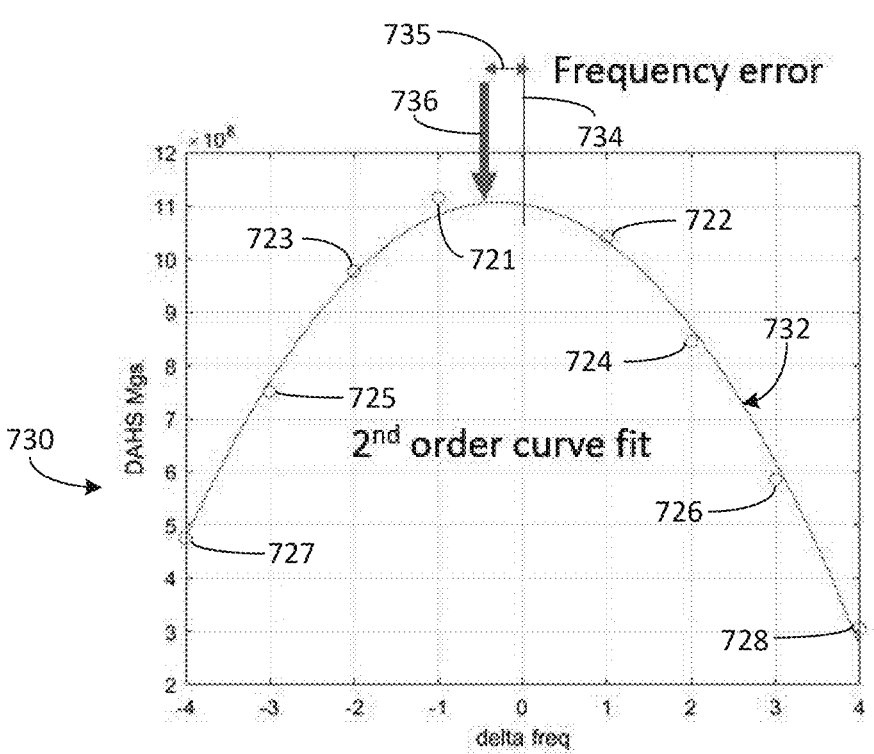
FIG. 7D is a graph illustrating a second order curve fit to eight frequency harmonics of a readback nT pattern, in accordance with aspects of this disclosure.
Figure 7E:
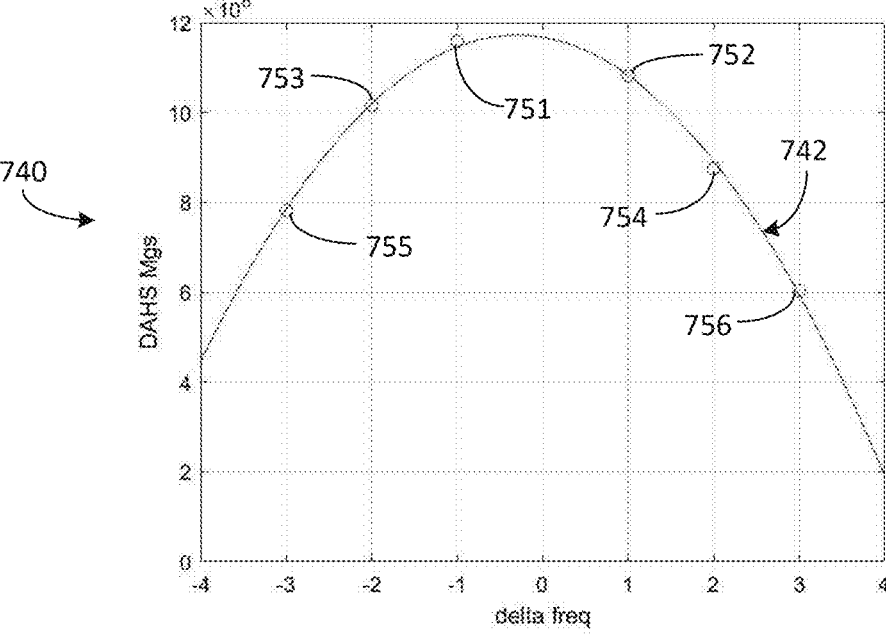
FIG. 7E is a graph illustrating a second order curve fit to six frequency harmonics of a readback nT pattern, in accordance with aspects of this disclosure.

While the example of FIG. 7D shows second-order curve 732 fitted using eight harmonic amplitude data points 721-728, it should be understood that the number of harmonics used in the polynomial fit may vary depending on system constraints and available frequency data. In some implementations, fewer or greater numbers of harmonics may be utilized to construct the second-order curve. For instance, graph 740 of FIG. 7E illustrates second-order curve 742 fitted to six harmonic amplitudes 751-756, instead of eight. A polynomial fit based on six or other numbers of harmonics is still capable of capturing the frequency response characteristics of the readback signal, albeit with potentially higher sensitivity to noise compared to the eight-harmonic fit in FIG. 7D. In general, the use of a greater number of harmonics provides better curve-fitting accuracy, which enhances the signal-to-noise ratio (SNR), which in turn contributes to greater touchdown sensitivity. However, even when a reduced number of harmonics is used, the second-order polynomial fit remains an effective method for tracking frequency shifts and detecting touchdown events.

In step 708, control circuitry 22 analyzes the second-order polynomial curve fitted to the harmonic amplitude data to identify any frequency shift attributable to touchdown-induced jitter noise. If no significant jitter noise is present, the peak of the fitted curve remains centered at the target or fundamental frequency $\omega_0$, indicating that recording head 318 is operating at a stable fly height without touchdown interference. However, if touchdown-induced jitter noise is present, the peak of the fitted curve shifts away from the target frequency, producing a measurable deviation that reflects the magnitude of touchdown-induced jitter noise. The frequency shift is determined by measuring the difference between the target frequency $\omega_0$ and the peak frequency of the fitted curve. With reference to FIG. 7D, second-order curve fit 732 models the harmonic response centered around target frequency $\omega_0$. The target or fundamental frequency 734 is located at delta zero, while the actual peak frequency of the fitted curve is located at peak 736. The measured frequency shift or error 735 is determined by computing the difference between target frequency 734 and peak frequency 736, providing a direct quantitative assessment of TD-induced frequency deviation.

The measured frequency shift 735 serves as a quantitative metric for touchdown detection. When the standard deviation of the frequency shift is plotted against TFC power, an upward bend in the frequency shift standard deviation curve emerges at higher TFC power levels, where mechanically induced jitter becomes a dominant factor. This upward bend is a characteristic signature of touchdown and serves as a reliable indicator of head-media contact. Similar to the phase shift standard deviation trends observed in FIG. 5D for ADC buffer method 500, the second order curve fit method exhibits a distinct transition in frequency stability as TFC power is increased beyond a threshold. In step 709, control circuitry 22 evaluates the magnitude of the detected frequency shift and compares it to a predefined threshold to determine whether it is sufficient to indicate touchdown. If the frequency shift exceeds the threshold, touchdown is confirmed. The implementation of method 700 within the broader framework of touchdown detection is further described in connection with method 80 of FIG. 2C.

Reference is made again to FIG. 2C, which is a flow diagram illustrating method 80 performed by control circuitry 22 for detecting head-media contact (touchdown) by measuring timing jitter noise, in accordance with aspects of this disclosure. Method 80 systematically determines the onset of touchdown by iteratively adjusting thermal fly-height control (TFC) power and measuring timing jitter noise using one of the jitter extraction methods described above, i.e., ADC buffer method 500, frequency delta method 600, or second order curve fit method 700. TFC power refers to the power applied to the TFC actuator or heater (e.g., TFC heaters 312 and 314 of FIG. 3) to thermally control the spacing between recording head 318 and disk surface 317. Method 80 includes separate operational flows for detecting touchdown during write operations (steps 82-88) and for detecting touchdown during read operations (steps 92-98).

For detecting when touchdown occurs during write operations, control circuitry 22 determines in step 81 that write touchdown detection is being performed. In step 82, an nT pattern is written to disk surface 317 at a target TFC power, which is a controlled power level that is iteratively changed to systematically adjust the fly height of recording head 318 when writing the nT pattern to the disk. The target TFC power is systematically adjusted (increased) throughout the write touchdown detection process to gradually expand or bulge head 318 toward disk surface 317 while writing data, allowing for a controlled assessment of when touchdown begins during write operations.

Once the nT pattern is written in step 82, control circuitry 22 operates head 318 to read the written nT pattern at operational TFC power and measures timing jitter from the readback nT pattern in step 84. Operational TFC power is the TFC power that is applied during real-world operating conditions, such that write touchdown detection is carried out under real-world rather than test-specific conditions. Timing jitter noise measurement in step 84 may be performed using any of the jitter extraction techniques discussed above: ADC buffer method 500 extracts jitter noise using full waveform digitization and demodulation to isolate phase variations caused by touchdown-induced jitter; frequency delta method 600 extracts jitter noise using frequency variations in the sinc function centered around the target frequency; and second order curve fit method 700 extracts jitter noise by fitting multiple harmonics to a second-order polynomial curve and analyzing frequency shifts. Alternatively, timing jitter noise measurement in step 84 may be performed using another suitable jitter extraction technique.

In step 86, the jitter noise measured in step 84 is compared to a threshold to determine whether touchdown-induced jitter noise is present. If the measured jitter noise does not exceed the threshold (86—NO), touchdown is not detected, the method returns to step 82 to write another nT pattern to the disk at a different (higher) target TFC power that positions head 318 incrementally closer to disk surface 317, and another jitter noise measurement is made in step 84 at operational TFC power. Steps 82-86 are repeated until the measured jitter noise exceeds the threshold (86—YES), in which case write touchdown is detected in step 88. This iterative process allows for identification of the exact TFC power at which touchdown occurs during write operations, which in turn facilitates precise calibration of write fly height parameters.

For detecting when touchdown occurs during read operations, control circuitry 22 determines in step 81 that read touchdown detection is being performed. In step 92, an nT pattern is written to disk surface 317 at operational TFC power, such that read touchdown detection is carried out with respect to an nT pattern written under real-world rather than test-specific conditions. The nT pattern may be written at the time of read, or may be prewritten once. Once the nT pattern is written in step 92 (at the time of read or pre-written), control circuitry 22 operates head 318 to read the written nT pattern at a target TFC power and measures timing jitter from the readback nT pattern in step 94. Here, the target TFC power is systematically adjusted (increased) throughout the read touchdown detection process to gradually expand or bulge head 318 towards disk surface 317 while reading data, allowing for a controlled assessment of when touchdown begins during read operations. The timing jitter noise measurement in step 94 is also performed using any of the jitter extraction techniques described above, including ADC buffer method 500, frequency delta method 600, or second-order curve fit method 700, or by using another suitable jitter extraction technique.

In step 96, the jitter noise measured in step 94 is compared to a threshold to determine whether touchdown-induced jitter noise is present. If the measured jitter noise does not exceed the threshold (96—NO), touchdown is not detected, the method returns to step 94 to re-read the nT pattern at a different (higher) target TFC power that positions head 318 incrementally closer to disk surface 317, and another jitter noise measurement is made. Steps 94-96 are repeated until the measured jitter noise exceeds the threshold (96—YES), in which case read touchdown is detected in step 98. This iterative process allows for identification of the exact TFC power at which touchdown occurs during read operations, which in turn facilitates precise calibration of write fly height parameters.

While jitter noise analysis provides a highly sensitive and direct indication of touchdown, traditional pulse TFC methods that incrementally adjust TFC power and analyze the changes in the YMK signals and S2S signals caused by those adjustments may still be used as a complementary or backup technique alongside jitter noise-based touchdown detection.

The methods and flow diagrams disclosed herein are executed by control circuitry 22, which is responsible for performing timing jitter noise measurement and touchdown detection in accordance with aspects of this disclosure. Control circuitry 22 may be implemented partially or wholly in one or more processing devices or components, individually or in combination, such as a programmable logic device (PLD), a field-programmable gate array (FPGA), an integrated circuit (IC) such as a system-on-a-chip (SoC), an application-specific integrated circuit (ASIC), an ARM-based microcontroller, or any other suitable processing unit. Control circuitry 22 may also include dedicated signal processing hardware such as a dual arbitrary harmonic sensor (DAHS) for real-time frequency domain analysis, as well as analog-to-digital converters (ADCs) and digital filters to facilitate jitter extraction and analysis.

In some examples, control circuitry 22 may comprise a microprocessor executing instructions stored in a computer-readable medium, such as a non-volatile semiconductor memory device. These instructions may be stored in external memory accessible to the microprocessor or integrated within an SoC. Alternatively, the instructions may be stored on a disk and loaded into a volatile semiconductor memory when the HDD is powered on. Control circuitry 22 may also include state machine logic, digital signal processing (DSP) circuits, and other suitable logic elements configured to implement the methods described herein using hardware, software, or a combination of both.

The methods and flow diagrams disclosed herein may be implemented using digital processing techniques, analog processing techniques, or a hybrid approach combining both. For example, the ADC buffer method involves digital demodulation and phase extraction, while the frequency delta and second-order curve fit methods involve frequency domain analysis and polynomial fitting to determine jitter-induced frequency shifts. Control circuitry 22 may implement these methods in firmware or dedicated hardware accelerators to optimize computational efficiency and reduce latency in real-time touchdown detection.

One or more processing devices may comprise control circuitry 22 and may be configured to perform, individually and/or collectively, some or all of the functions of control circuitry 22 as described herein. These processing devices may be physically integrated within the HDD or may be abstracted from direct physical proximity to the disk drive. In certain implementations, processing devices executing jitter extraction and touchdown detection methods may be located within or proximate to a unitary HDD product, a rack-mounted data storage system containing multiple HDDs, or a larger networked environment, such as a local area network (LAN), storage area network (SAN), data center infrastructure, or cloud-based storage service.

While the jitter-based touchdown detection methods of this disclosure have been described primarily with reference to heat-assisted magnetic recording (HAMR) drives, HDDs incorporating the techniques described herein may include other types of magnetic storage drives, such as conventional perpendicular magnetic recording (PMR) drives, micro-wave-assisted magnetic recording (MAMR) drives, hybrid storage drives that integrate solid-state memory, and optical or other emerging disk drive technologies. Additionally, the disclosed storage systems and methods may be implemented in a wide range of devices that utilize high-density data storage, including but not limited to personal computing devices, enterprise data servers, media content storage and distribution systems, and cloud-based storage platforms. The jitter noise-based touchdown detection methods disclosed herein may be leveraged across different storage architectures to enhance head-disk interface management, optimize fly-height calibration, and improve overall reliability in various HDD applications.

While certain embodiments are described herein, they are provided by way of example only and do not limit the scope of this disclosure. Various modifications, substitutions and omissions may be made without departing from the spirit and scope of the invention. The methods and processes described herein are not limited to any particular sequence and may be used independently or in combination. Steps may be omitted, reordered, or added in different implementations. No aspect of this description should be interpreted as requiring any specific feature, component, or step as essential or indispensable. Many variations, modifications, and enhancements are possible, all of which fall within the scope of the invention as defined by the following claims.

The invention claimed is:

1. A data storage device comprising:
   a magnetic storage medium;
   a recording head configured to write data to and read data from the magnetic storage medium;
   a thermal fly-height control (TFC) actuator configured to adjust spacing between the recording head and the magnetic storage medium; and
   one or more processing devices or components, configured individually or in combination, to detect touchdown of the recording head on the magnetic storage medium by:
   writing a reference pattern to the magnetic storage medium at a target TFC power;
   reading the reference pattern written to the magnetic storage medium at an operational TFC power;
   measuring timing jitter from the read reference pattern;
   when the measured timing jitter exceeds a threshold, detecting a write touchdown; and
   when the measured timing jitter does not exceed the threshold, writing additional reference patterns to the magnetic storage medium at incrementally adjusted target TFC powers until the measured timing jitter exceeds the threshold.

2. The data storage device of claim 1, further comprising an analog-to-digital converter (ADC) buffer configured to digitize the read reference pattern, and wherein measuring the timing jitter comprises:
   demodulating a digitized read reference pattern; and
   applying a low-pass filter to extract phase shift jitter indicative of write touchdown.

3. The data storage device of claim 1, wherein measuring the timing jitter comprises:
   converting the read reference pattern to a frequency domain waveform; and
   analyzing the frequency domain waveform to identify frequency shifts indicative of write touchdown.

4. The data storage device of claim 1, wherein measuring the timing jitter comprises:
   extracting harmonic components from the read reference pattern;
   fitting the extracted harmonic components to a second order curve; and
   analyzing the second order curve to identify frequency shifts indicative of write touchdown.

5. The data storage device of claim 4, further comprising a dual arbitrary harmonic sensor (DAHS) configured to simultaneously extract at least six harmonic components from the read reference pattern.

6. A data storage device comprising:
   a magnetic storage medium;
   a recording head configured to write data to and read data from the magnetic storage medium;
   a thermal fly-height control (TFC) actuator configured to adjust spacing between the recording head and the magnetic storage medium; and
   one or more processing devices or components, configured individually or in combination, to detect touchdown of the recording head on the magnetic storage medium by:

reading, at a target TFC power, a reference pattern written to the magnetic storage medium at an operational TFC power;
   measuring timing jitter from the read reference pattern;
   when the measured timing jitter exceeds a threshold, detecting a read touchdown; and
   when the measured timing jitter does not exceed the threshold, re-reading the reference pattern at incrementally adjusted target TFC powers until the measured timing jitter exceeds the threshold.

7. The data storage device of claim 6, further comprising an analog-to-digital converter (ADC) buffer configured to digitize the read reference pattern, and wherein measuring the timing jitter comprises:
   demodulating a digitized read reference pattern; and
   applying a low-pass filter to extract phase shift jitter indicative of read touchdown.

8. The data storage device of claim 6, wherein measuring the timing jitter comprises:
   converting the read reference pattern to a frequency domain waveform; and
   analyzing the frequency domain waveform to identify frequency shifts indicative of read touchdown.

9. The data storage device of claim 6, wherein measuring the timing jitter comprises:
   extracting harmonic components from the read reference pattern;
   fitting the extracted harmonic components to a second order curve; and
   analyzing the second order curve to identify frequency shifts indicative of read touchdown.

10. The data storage device of claim 9, further comprising a dual arbitrary harmonic sensor (DAHS) configured to simultaneously extract at least six harmonic components from the read reference pattern.

11. A method for detecting touchdown of a recording head on a magnetic storage medium of a data storage device, the method comprising:
   writing a reference pattern to the magnetic storage medium at a target thermal fly-height control (TFC) power;
   reading the reference pattern written to the magnetic storage medium at an operational TFC power;
   measuring timing jitter from the read reference pattern;
   when the measured timing jitter exceeds a threshold, detecting a write touchdown; and
   when the measured timing jitter does not exceed the threshold, writing additional reference patterns to the magnetic storage medium at incrementally adjusted target TFC powers until the measured timing jitter exceeds the threshold.

12. The method of claim 11, wherein measuring the timing jitter comprises:
   digitizing the read reference pattern using an analog-to-digital converter (ADC) buffer;
   demodulating the digitized read reference pattern; and
   applying a low-pass filter to extract phase shift jitter indicative of write touchdown.

13. The method of claim 11, wherein measuring the timing jitter comprises:
   converting the read reference pattern to a frequency domain waveform; and
   analyzing the frequency domain waveform to identify frequency shifts indicative of write touchdown.

14. The method of claim 11, wherein measuring the timing jitter comprises:

extracting harmonic components from the read reference pattern;

fitting the extracted harmonic components to a second order curve; and analyzing the second order curve to identify frequency shifts indicative of write touchdown.

15. The method of claim 14, further comprising simultaneously extracting at least six harmonic components from the read reference pattern using a dual arbitrary harmonic sensor (DAHS).

16. A method for detecting touchdown of a recording head on a magnetic storage medium of a data storage device, the method comprising:

reading, at a target thermal fly-height control (TFC) power, a reference pattern written to the magnetic storage medium at an operational TFC power;

measuring timing jitter from the read reference pattern;

when the measured timing jitter exceeds a threshold, detecting a read touchdown; and when the measured timing jitter does not exceed the threshold, re-reading the reference pattern at incrementally adjusted target TFC powers until the measured timing jitter exceeds the threshold.

17. The method of claim 16, wherein measuring the timing jitter comprises:

digitizing the read reference pattern using an analog-to-digital converter (ADC) buffer;

demodulating the digitized read reference pattern; and applying a low-pass filter to extract phase shift jitter indicative of read touchdown.

18. The method of claim 16, wherein measuring the timing jitter comprises:

converting the read reference pattern to a frequency domain waveform; and analyzing the frequency domain waveform to identify frequency shifts indicative of read touchdown.

19. The method of claim 16, wherein measuring the timing jitter comprises:

extracting harmonic components from the read reference pattern;

fitting the extracted harmonic components to a second order curve; and analyzing the second order curve to identify frequency shifts indicative of read touchdown.

20. The method of claim 19, further comprising simultaneously extracting at least six harmonic components from the read reference pattern using a dual arbitrary harmonic sensor (DAHS).

* * * * *